United States Patent
Gabe et al.

(10) Patent No.: US 7,337,608 B2
(45) Date of Patent: Mar. 4, 2008

(54) EXHAUST GAS CLEANING SYSTEM

(75) Inventors: Masashi Gabe, Fujisawa (JP);
Yoshihisa Tashiro, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 315 days.

(21) Appl. No.: 10/551,442

(22) PCT Filed: May 27, 2004

(86) PCT No.: PCT/JP2004/007254

§ 371 (c)(1),
(2), (4) Date: Sep. 29, 2005

(87) PCT Pub. No.: WO2004/106703

PCT Pub. Date: Dec. 9, 2004

(65) Prior Publication Data

US 2006/0201144 A1    Sep. 14, 2006

(30) Foreign Application Priority Data

May 28, 2003  (JP) .............................. 2003-151113

(51) Int. Cl.
*F01N 3/00* (2006.01)
(52) U.S. Cl. ........................... 60/286; 60/285; 60/287; 60/291; 60/292; 60/295
(58) Field of Classification Search .................. 60/278, 60/280, 285, 286, 287, 291, 292, 295, 297, 60/311
See application file for complete search history.

(56) References Cited

U.S. PATENT DOCUMENTS 6,708,487 B2 *  3/2004  Morimoto et al. ............ 60/311
6,817,174 B1 * 11/2004  Igarashi et al. ............... 60/295
6,834,496 B2 * 12/2004  Nakatani et al. .............. 60/274

(Continued)

FOREIGN PATENT DOCUMENTS

JP  2001-115822  4/2001

(Continued)

OTHER PUBLICATIONS

International Search Report dated Sep. 21, 2004 in correspoding PCT Patent Application No. PCT/JP2004/007254.

*Primary Examiner*—Binh Q. Tran
(74) *Attorney, Agent, or Firm*—Staas & Halsey LLP

(57) ABSTRACT

An exhaust gas purifying system causes less torque fluctuation and is capable of preventing the occurrence of white smoke in a regeneration control operation for regenerating a continuous regeneration DPF 3. When the continuous regeneration DPF 3 with an oxidation catalyst 3Aa on the upstream side of a filter 3Ab is controlled to regenerate, an exhaust throttle valve 31 provided in an exhaust passage 2 is closed and a delay multi-step injection control is performed to increase the temperature of the exhaust gas if an exhaust temperature T1 at the inlet of the oxidation catalyst 3Aa is less than the activation temperature Ta of the oxidation catalyst. After the exhaust temperature T1 at the inlet of the oxidation catalyst 3Aa has risen to the activation temperature Ta of the oxidation catalyst or higher, the exhaust throttle valve 31 is opened in a stepwise or continuous manner so that the exhaust temperature T2 at the inlet of the filter 3Ab rises to a lower limit temperature of PM forced combustion Tb1 or higher.

7 Claims, 10 Drawing Sheets

U.S. PATENT DOCUMENTS 6,901,747 B2 *  6/2005  Tashiro et al. ................ 60/286
6,966,179 B2 * 11/2005  Onodera et al. .............. 60/295
7,246,485 B2 *  7/2007  Ohki et al. ................... 60/285

FOREIGN PATENT DOCUMENTS

| JP | 2002-242732 | 8/2002 |
| JP | 2003-83030 | 3/2003 |

* cited by examiner

EXHAUST GAS CLEANING SYSTEM

TECHNICAL FIELD

The present invention relates to an exhaust gas purifying system with a continuous regeneration diesel particulate filter that purifies exhaust gas discharged from an engine.

BACKGROUND ART

In the same way as for NOx, CO, and also HC etc., restrictions on the volume of Particulate Matter (hereinafter referred to as "PM") discharged from diesel engines grow stricter every year. Simple engine improvements in response to such intensification of regulations are not sufficient to realize full compliance. Techniques for accumulating the PM discharged from engines in a filter known as a Diesel Particulate Filter (hereinafter referred to as "DPF") and for reducing the volume thereof through being externally discharged are also being developed.

Ceramic monolithic-honeycomb wall-flow type filters, mesh-type filters using ceramic or metallic fibers, and the like are available as such DPFs for direct accumulation of PM. In the same way as other exhaust gas purifying systems, an exhaust gas purifying system using a DPF is disposed at an intermediate position along the engine's exhaust passage, and purifies exhaust gases generated in the engine.

The exhaust pressure acting on the DPF increases in proportion to the volume of PM accumulation therein. Accordingly, any PM accumulation in the DPF must be periodically removed through a process such as combustion, thus regenerating the DPF. A large number of methods have been proposed for use in the regeneration process—for example, electrical-heater types, burner types, and reverse cleaning types.

However, when any of these regeneration methods are utilized, energy must be externally provided in order to facilitate PM combustion. And accordingly, problems such as deteriorated fuel efficiency, difficulty in maintaining control during regeneration, and the need for a double DPF system performing alternate PM accumulation and PM combustion (or DPF regeneration) are experienced. This in turn leads to the problem of the need for increasingly large and complex systems.

In order that these problems may be resolved, a DPF regeneration technique that performs PM oxidation utilizing heat of exhaust gases discharged by an engine has been proposed. In this technique, the PM oxidation temperature is reduced through the use of an oxidation catalyst, and accordingly, there is no need for external energy to be input. As the DPF regeneration process can continuously regenerate DPF at a fundamental level, a DPF system utilizing this technology is referred to as a Continuous Regeneration DPF System. Such a system is advantageous in that it features a single simplified DPF system, and also simplifies the control required in that DPF regeneration.

FIG. 8 presents an $NO_2$ regeneration DPF system 1X as an example. In the $NO_2$ regeneration DPF system 1X, the PM is oxidized with nitrogen dioxide ($NO_2$), thus realizing regeneration. In this system, an oxidation catalyst 3Aa that oxidizes the nitrogen oxide (NO) in the exhaust gas is disposed on the upstream side of the standard wall flow filter 3Ab. Accordingly, almost all of the NOx in the exhaust gas, having passed through the oxidation catalyst 3Aa, has become $NO_2$. The PM accumulation in the wall flow filter 3Ab disposed on the downstream side is oxidized by this $NO_2$, becoming carbon dioxide ($CO_2$). In this way, the PM is subsequently removed. Since this $NO_2$ has a lower energy barrier than $O_2$, the PM oxidation temperature (and the DPF regeneration temperature) can be reduced. Accordingly, continuous combustion of PM can be carried out using thermal energy contained in the exhaust gas without the need for any externally provided energy.

Note that in FIG. 8, E is a diesel engine, 2 is an exhaust passage, 4 is a fuel pump system, 5 is an electronic control system, 7 is a battery, 8 is a silencer, and 9 is a fuel tank.

Furthermore, FIG. 9 presents more improved $NO_2$ regeneration DPF system 1Y, than that of FIG. 8. In this improved system 1Y, a porous catalytic coat layer 31 of oxidation catalyst 32A is applied to the porous wall 30 of wall flow filter 3B. As a result of this configuration, oxidation of NO and oxidation of the PM by the $NO_2$ produced in that reaction both occur on the wall surface of the wall flow filter 3B. Accordingly, in this configuration the system has been even more simplified.

FIG. 10 shows an additional system 1Z. In this system 1Z, a porous catalytic coat layer 31 of an oxidation catalyst 32A and a PM oxidation catalyst 32B of oxide and the like is applied to the porous wall 30 of the wall flow filter 3C. As a result of this configuration, the PM accumulation in the filter 3C is combusted at a low temperature, and continuous regeneration of DPF is carried out.

As these DPF systems with catalysts utilize the oxidation reaction of PM by catalysts and $NO_2$, the start temperature of PM oxidation is lower than that of normal filters. Accordingly, continuous regeneration of DPF is facilitated.

Nevertheless, even though the start temperature of PM oxidation is lowered, exhaust temperature of approximately 350° C. is required. For this reason, since the exhaust temperature is low during low-load driving, idling, and the like, PM oxidation and DPF self-regeneration do not take place. Consequently, in case that the engine remains in a state of idling, low-load driving, or the like, conditions for initiating PM oxidation are not achieved, even if PM accumulates. Therefore, exhaust pressure rises, and fuel efficiency is deteriorated as a result. Furthermore, there is a danger of engine stopping and other similar problems.

In these continuous regeneration DPF systems, conditions signaling the requirement for DPF regeneration have been setup. Determination of whether or not these conditions have been satisfied can be carried out by calculating the volume of PM accumulation in the filter based on engine's driving conditions, and/or by estimating the volume of PM accumulation based on corresponding filter pressure loss. Furthermore, when these conditions have been satisfied, control necessary for DPF regeneration is carried out. As a result of this control, the temperature of the exhaust gas is raised in a forcible manner, forced combustion of the accumulated PM is carried out, and the PM is removed.

In order to perform forced combustion of PM in a continuous regeneration DPF system, an electronic-control fuel injection system such as the common-rail is used to perform the following type of DPF regeneration control.

First of all, delay multi-step injection is carried out. Specifically, this comprises multi-step injection of small injection quantity prior to main injection and significant delay of main injection. By performing injection in this way, the exhaust temperature is raised above the activation temperature of the oxidation catalyst.

After raising the exhaust temperature through delay multi-step injection, normal injection control is restored, and through post injection, exhaust-pipe injection, or the like, fuel such as diesel oil (HC) is added to the inside of the exhaust pipe. This fuel is combusted by using an oxidation catalyst disposed on the upstream side. As a result of this combustion, the temperature of the exhaust gas flowing into the filter disposed on the downstream side is raised above the temperature required for forced combustion of the accumulated PM. Accordingly, the PM accumulation in the DPF is forcibly combusted and removed.

Furthermore, another method has been proposed. In this method, exhaust throttling is also carried out in addition to rise the temperature of the exhaust gas through multi-step injection. This dual process raises the engine's exhaust pressure, increases the amount of residual exhaust gas in the intake process, and in addition, raises the temperature of the exhaust gas. As a result of this increase in temperature of the exhaust gas, the ignition performance and the combustion performance of the injection fuel are improved. Accordingly, the exhaust temperature is increased.

An exhaust gas purifying system for a diesel engine that uses this method has been proposed in Japanese patent application Kokai publication No. 1992-81513. In this system, an exhaust throttle valve is provided on the downstream side of the trap filter (DPF). Furthermore, the degree of opening of the exhaust throttle valve is controlled while the filter is performing regeneration in order to maintain the exhaust temperature within a given regeneration temperature range, or in other words, in order to adjust the exhaust temperature at the inlet of the DPF to a given temperature.

However, in the control of DPF regeneration characteristic of the prior art, in which multi-step injection is used in combination with this exhaust throttling, when controlled driving is carried out for the purpose of regeneration, there is a problem of excessively large torque fluctuation. Furthermore, this control is also problematic in that white smoke is emitted.

In other words, during controlled driving for this regeneration, normal injection control is restored after the exhaust temperature has been raised beyond the activation temperature of the oxidation catalyst by multi-step injection performed in combination with exhaust throttling. Accordingly, when normal injection control is restored, torque fluctuation occurs as a result of sudden changes in exhaust pressure and large changes in injection timing. Furthermore, since the temperature of the exhaust gas entering the oxidation catalyst lowers by performing the normal injection, there are cases in which the multi-step injection in combination with exhaust throttling needs to be restored again from the normal injection control. However, torque fluctuation occurs in such cases as well.

Furthermore, when switching from multi-step injection in combination with exhaust throttling to normal injection control, the corresponding changes in injection quantity can lead to the generation of HC and white smoke.

DISCLOSURE OF INVENTION

In order to resolve the above-described problems, the present invention provides an exhaust gas purifying system with little torque fluctuation that prevents the occurrence of white smoke during controlled driving for DPF regeneration, using continuous regeneration DPF.

An exhaust gas purifying system capable of achieving the above-described purposes has a filter for accumulating particulate matters that is provided in an exhaust passage of an internal combustion engine, an oxidation catalyst provided on the upstream side of the filter, an exhaust throttle valve provided on the upstream side of the oxidation catalyst or on the downstream side of the filter, the first exhaust temperature sensor provided at the inlet of the oxidation catalyst, the second exhaust temperature sensor provided between the oxidation catalyst and the filter, and a control device for regeneration of the filter, in which the control device, upon the execution of control for regeneration of the filter, raises the temperature of the exhaust gas, by performing delay multi-step injection control in a state of closing the exhaust throttle valve, when the exhaust temperature detected by the first exhaust temperature sensor is a given first determining temperature or lower, and controls for stepwise opening or continuous opening of the exhaust throttle valve after the exhaust temperature detected by the first exhaust temperature sensor has risen to a given second determining temperature or higher, in such a way that the exhaust temperature detected by the second exhaust temperature sensor rises to a given third determining temperature or higher.

As a result of this configuration, the following is carried out during control for the DPF regeneration when the exhaust temperature at the inlet of the oxidation catalyst is lower than the first determining temperature corresponding to the activation temperature of the oxidation catalyst or the like. In other words, when the exhaust temperature is increased, exhaust throttling is performed to significantly delay the accidental fire limit for the first injection timing. In addition, increasing of the injection quantity is facilitated. Accordingly, the first combustion to occur is large in nature. The force propagated to subsequent combustions is thus increased, and this makes it possible for complete combustion up to lean air-fuel mixture. Accordingly, both the emission of white smoke and the occurrence of accidental fire are prevented, and the exhaust temperature can be significantly increased in an efficient manner.

Next, when the exhaust temperature at the inlet of the oxidation catalyst rises to or beyond the second determining temperature corresponding to the activation temperature of the oxidation catalyst or the like, normal ignition control is not restored. Instead, delay multi-step injection performed in combination with exhaust throttling is continued, and the degree of opening of the exhaust throttle valve is adjusted in a stepwise or continuous manner. In this way, the combustion condition within the combustion chamber is controlled. By controlling this combustion condition, the volume of HC combusted by using the oxidation catalyst supplied to the exhaust gas is controlled. Furthermore, this supply volume is used to control the exhaust temperature at the DPF inlet. Accordingly, it is possible to avoid sudden changes in exhaust pressure, injection timing, and injection quantity. As a result, the fluctuation in output torque and the occurrence of white smoke can also be prevented.

Next, the configuration of the above-described exhaust gas purifying system is such that, after the exhaust temperature at the inlet of the oxidation catalyst has risen to the second determining temperature or higher, if the exhaust temperature detected by the second exhaust temperature sensor rises to or beyond the third determining temperature, the exhaust throttle valve can be closed in a stepwise or continuous manner.

Furthermore, the configuration thereof is such that, after the exhaust temperature at the inlet of the oxidation catalyst has risen to the second determining temperature or higher, if the exhaust temperature detected by the second exhaust temperature sensor rises to or beyond a given fourth determining temperature, which is higher than the third determining temperature, the exhaust throttle valve control and delay multi-step injection control are released.

As a result of this configuration, it is possible to limit the rise in exhaust temperature. Accordingly, it is possible to avoid runaway combustion of PM accumulation in the DPF and to simultaneously conserve fuel used for exhaust temperature rise.

Furthermore, the above-described exhaust gas purifying system is configured such that, upon regeneration control for the DPF, when the exhaust temperature detected by the first exhaust temperature sensor is higher than the first determining temperature, delay multi-step injection control in a state of the exhaust throttle valve open is carried out, raising the temperature of the exhaust gas such that the exhaust temperature detected by the second exhaust temperature sensor rises to or beyond the third determining temperature.

As a result of this configuration, if the exhaust temperature corresponding to the engine's driving condition is higher than the given first determining temperature when the need for forced DPF regeneration arises, exhaust throttling is not carried out, and the temperature of the exhaust gas is increased by delay multi-step injection. Consequently, in comparison to systems in which exhaust throttling is carried out for every forced DPF regeneration, fuel consumption is markedly reduced. Accordingly, it is possible to combust and remove PM from the DPF in an efficient manner and with low fuel consumption.

The first determining temperature and the second determining temperature are related to the exhaust temperature detected by the first exhaust temperature sensor and the activation temperature of the oxidation catalyst. Since these determining temperatures differ from the actual temperature of the oxidation catalyst because of the location of measurement and historical factors, strictly speaking, they also differ from the activation temperature of the oxidation catalyst. However, in order to simplify control, it is preferable that the first determining temperature is set slightly higher than the activation temperature of the oxidation catalyst. Furthermore, it is also preferable that the second determining temperature is set as the activation temperature of the oxidation catalyst.

The third determining temperature is also related to the exhaust temperature detected by the second exhaust temperature sensor and the activation temperature of the oxidation catalyst. Since this determining temperature differs from the actual start temperature of PM combustion because of the location of measurement and historical factors, strictly speaking, this also differs from the start temperature of PM combustion. However, in order to simplify control, it is preferable that the third determining temperature is set as the exhaust temperature corresponding to the start of combustion of particulate matters accumulated in the filter.

The above-described filter is formed from a filter with oxidation catalyst, PM oxidation catalyst, or the combination thereof. As a result of this configuration, the exhaust temperature to start combustion of particulate matters accumulated in the filter can be lowered, compared to when the filter does not support catalyst. Accordingly, fuel efficiency can be improved.

Using the exhaust gas purifying system according to the present invention, it is possible to perform PM combustion for efficient PM regeneration even in an idling or low-load driving condition, in which forced combustion of the PM accumulation in the filter was impossible, in case of the prior art, because of a low exhaust temperature. In other words, delay multi-step injection performed in combination with exhaust throttling and exhaust temperature regulation through adjustment of the degree of opening of the exhaust throttling improve the ignition performance as well as the combustion performance of the injected fuel. Consequently, while avoiding the occurrence of torque fluctuation and the extreme generation of white smoke, temperature raising control of the exhaust gas is carried out with acute sensitivity, not only to changes in the exhaust temperature on the upstream side of the oxidation catalyst, but also to changes in the exhaust temperature on the downstream thereof. Accordingly, even when the fuel required for raising the temperature of the exhaust gas is in short supply, it is possible to significantly increase the temperature of the exhaust gas in an efficient manner. As a result, PM combustion for efficiently regenerating PM can be carried out.

Accordingly, this exhaust gas purifying system provides a continuous regeneration DPF capable of preventing the occurrence of white smoke and capable of reducing torque fluctuation during regeneration control for DPF regeneration.

BEST MODE FOR CARRYING OUT THE INVENTION

Hereinafter, the preferred embodiments of the exhaust gas purifying system according to the present invention will be described with reference to the accompanying drawings. The following explanation will use the example of an exhaust gas purifying system provided with a continuous regeneration diesel particulate filter (DPF) comprising a combination of an oxidization catalyst (DOC) and a filter with a catalyst (CSF).

Figure 1:
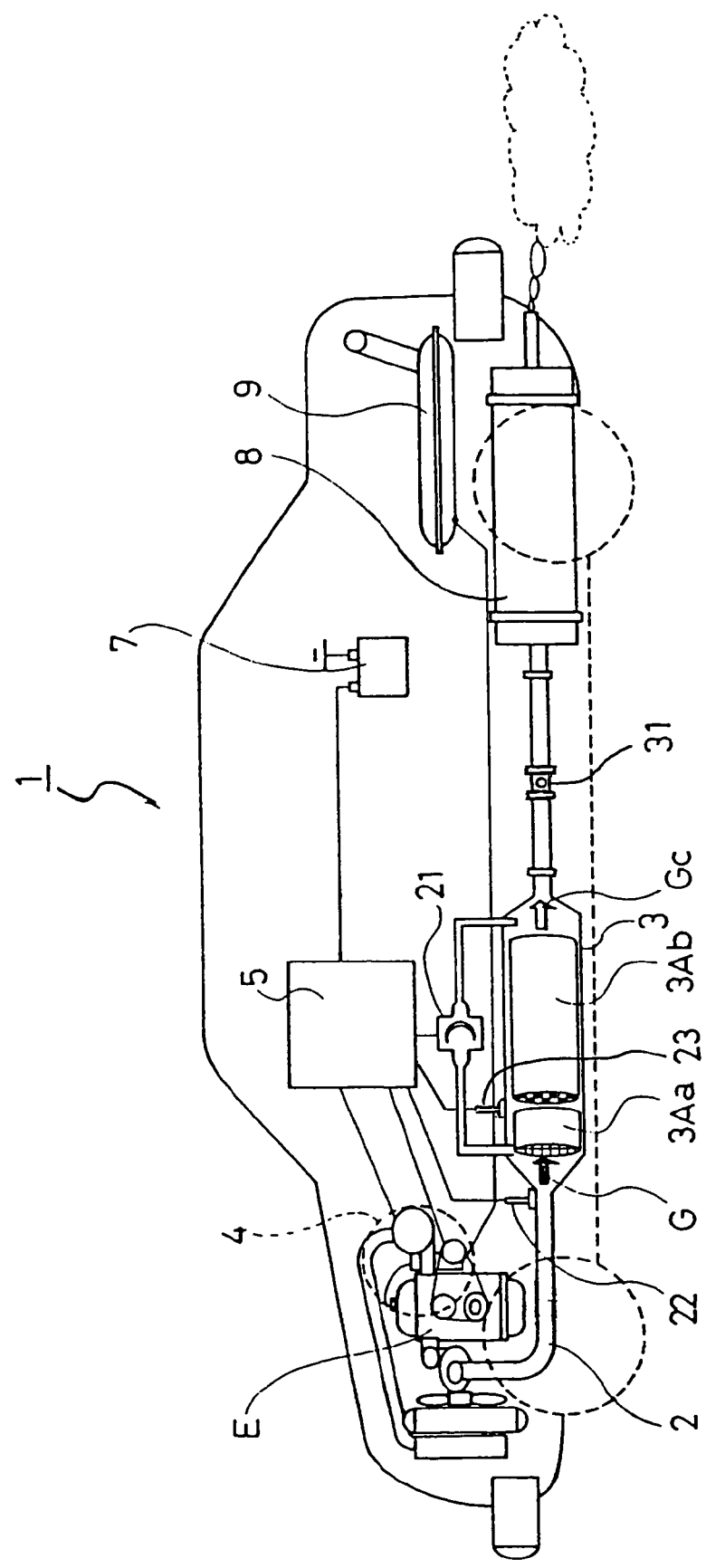
FIG. 1 is a systematic block diagram of the exhaust gas purifying system according to an embodiment of the present invention.
Figure 2:
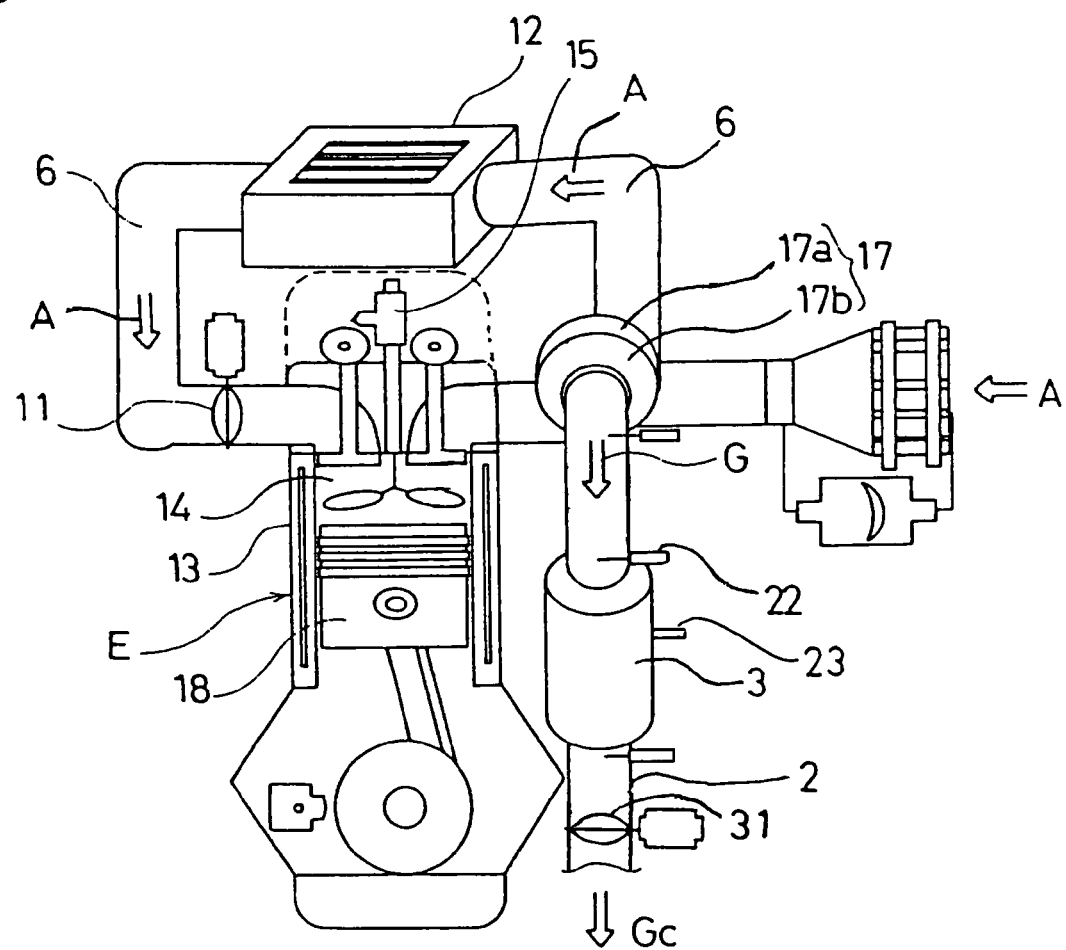
FIG. 2 is a diagram of the configuration of the engine section of the exhaust gas purifying system according to an embodiment of the present invention.

FIG. 1 and FIG. 2 show the configuration of an exhaust gas purifying system 1 according to an embodiment of the present invention. In this exhaust gas purifying system 1, a continuous regeneration DPF 3 is provided in the exhaust passage 2 connected to the exhaust manifold of a diesel engine E. This continuous regeneration DPF 3 has an oxidation catalyst 3Aa on the upstream side thereof and a filter 3Ab with a catalyst on the downstream side thereof.

The oxidation catalyst 3Aa is formed so as to carry an oxidization catalyst of platinum (Pt) and the like on a support body with a porous ceramic honeycomb configuration and the like. The filter 3Ab with a catalyst is formed of a monolithic honeycomb wall-flow type filter with inlets and exits to channels in a porous ceramic honeycomb alternately closed. Oxidation catalysts of platinum and the like as well as PM oxidation catalysts of cerium oxide and the like are supported on this filter portion. In this filter 3Ab with a catalyst, particulate matters (PM) contained in the exhaust gas G are trapped in the porous ceramic walls.

An exhaust throttle valve (or exhaust brake) 31 is provided for exhaust throttling on the exhaust passage 2 disposed on the downstream side of the continuous regeneration DPF 3. A differential pressure sensor 21 is provided in the pipe connected in front of and behind the continuous regeneration DPF 3 in order to estimate the volume of PM accumulation in the filter 3Ab with a catalyst. Furthermore, in order to facilitate the control required for regeneration of the filter 3Ab with a catalyst, an oxidation-catalyst inlet exhaust temperature sensor (or the first exhaust temperature sensor) 22 disposed on the upstream side of the oxidation catalyst 3Aa and a filter inlet exhaust temperature sensor (or the second exhaust temperature sensor) 23 disposed both on the downstream side of the oxidation catalyst 3Aa and on the upstream side of the filter 3Ab with a catalyst are provided in the exhaust gas purifying system 1.

The output values from these sensors are input to a control device (electronic control box: engine control unit: ECU) 5. In addition to controlling the overall operation of the engine E, the control device 5 also controls the regeneration of the filter 3Ab with a catalyst. Furthermore, fuel injection valve 15 of the engine E, an exhaust throttle valve 31, an intake valve 11 provided in the intake passage 6 for regulating the intake quantity supplied to the intake manifold, and the like are controlled by using the control signals output from the control device 5.

This fuel injection valve 15 is connected to a common-rail (not shown) that temporarily stores the high pressure fuel pressurized by the fuel pump (not shown). In order to drive the engine, the on/off condition of the PTO switch, the on/off condition of the neutral switch, the vehicle speed, the coolant temperature, the engine speed, the load (acceleration opening), and other data items are input into the control device 5.

The intake air A passes through the compressor 17a of a turbocharger 17 and an intercooler 12 in the intake passage 6, and after the intake quantity is adjusted by the intake valve 11, it flows into the combustion chamber 14 inside the cylinder 13. A fuel injection valve 15 is provided at the top of the combustion chamber 14. As a result of fuel injection from this fuel injection valve 15, the fuel and the intake air A are mixed. This air-fuel mixture is compressed by the piston 18, which leads to the combustion as a result of spontaneous ignition, generating the exhaust gas G. This exhaust gas G passes through the turbine 17b of the turbocharger 17 in the exhaust passage 2 and enters the continuous regeneration DPF 3. In the continuous regeneration DPF 3, the exhaust gas G becomes purified exhaust gas Gc, and after passing through the exhaust throttle valve 31 and silencer 8, it is discharged into the atmosphere.

Figure 3:
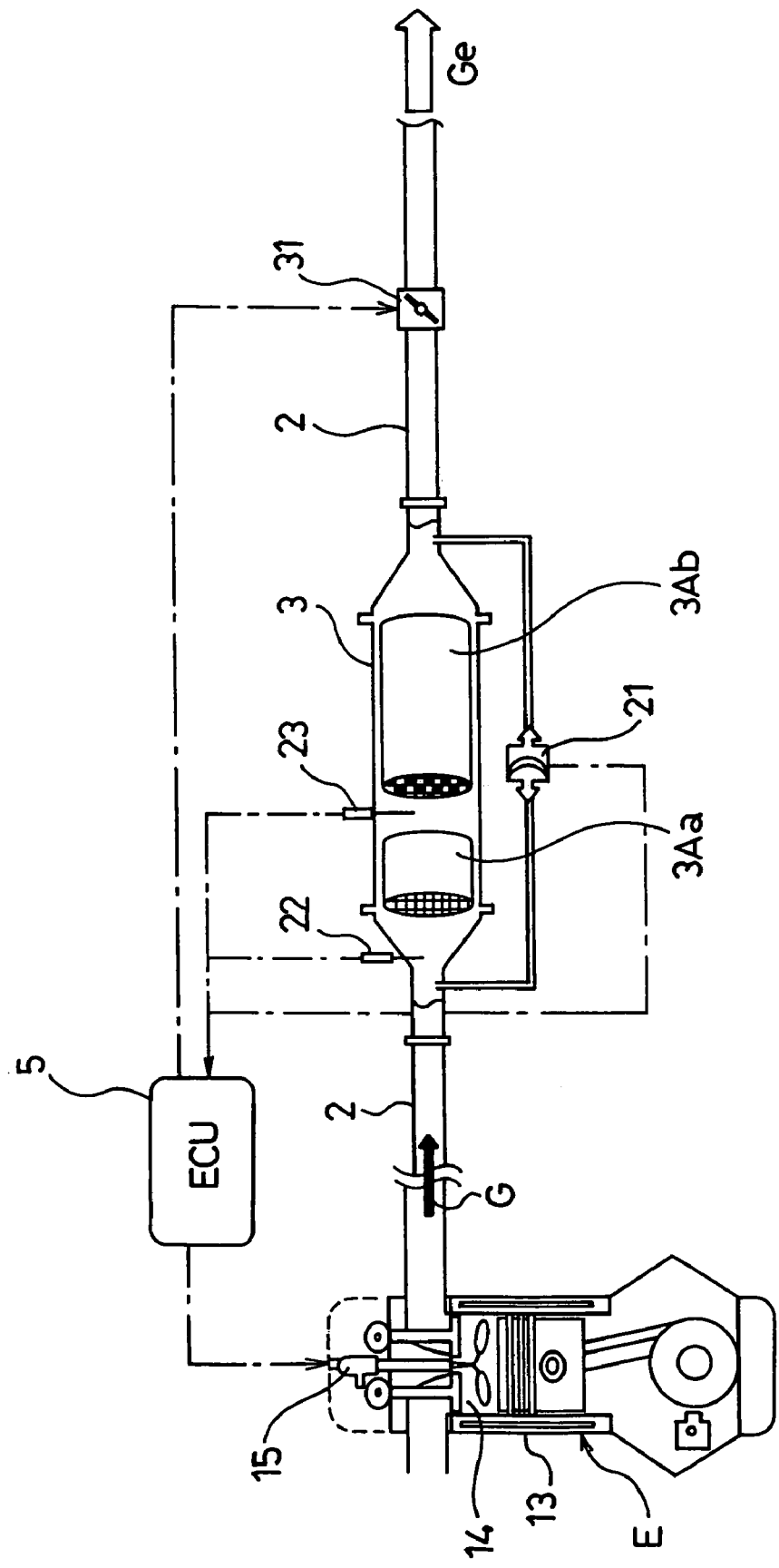
FIG. 3 is a systematic diagram of the control according to an embodiment of the present invention.

Hereinafter, control for regeneration of the DPF by the exhaust gas purifying system 1 will be explained. The control for regeneration of the DPF is carried out by the control system shown in FIG. 3 and in accordance with the control flow illustrated in FIG. 4 and FIG. 5. This control flow is presented as a control flow repeatedly called and executed by the main control flow.

Figure 4:
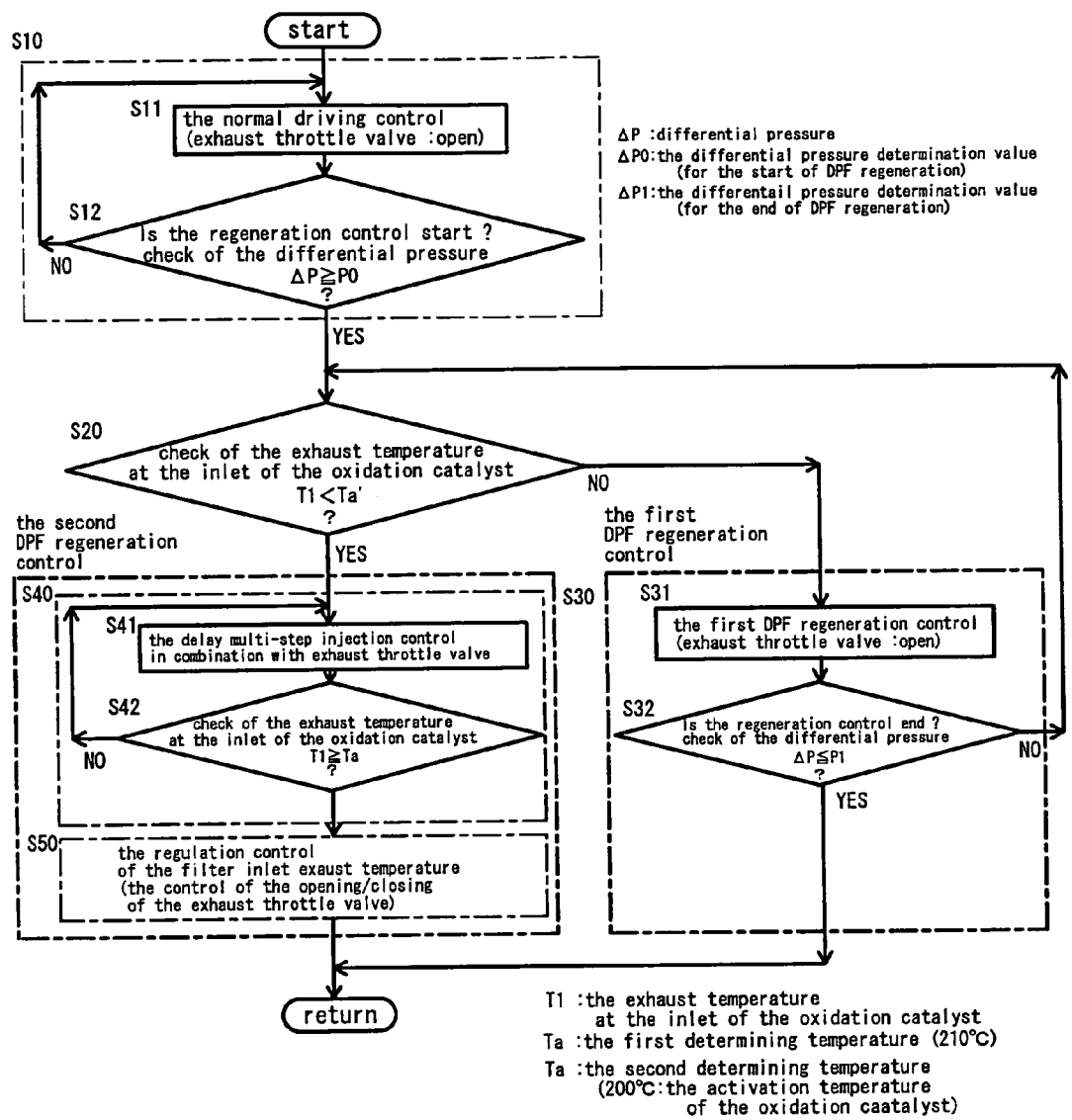
FIG. 4 is a drawing showing the control flow for regeneration according to the present invention.
Figure 5:
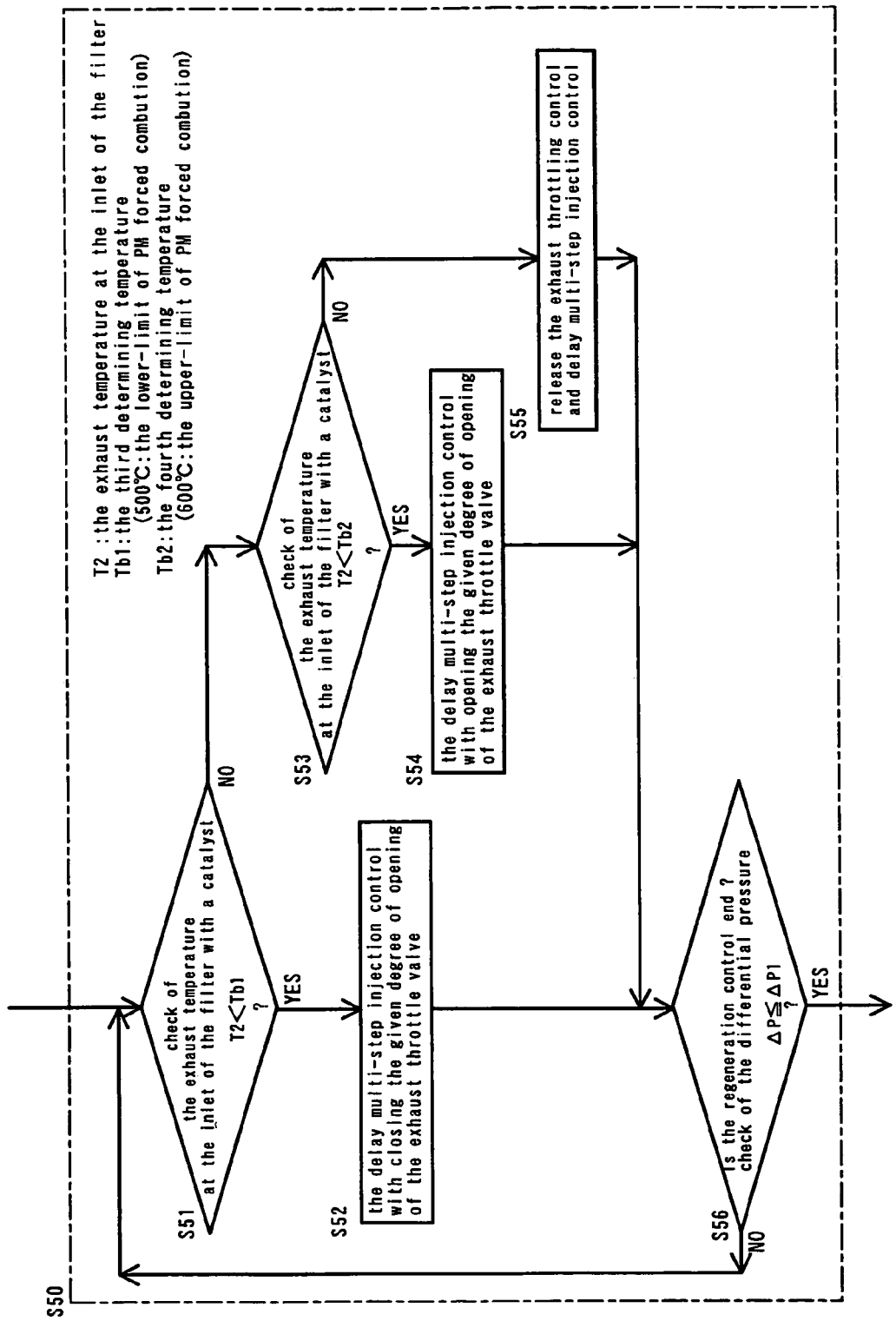
FIG. 5 is a drawing showing a portion of the control flow from FIG. 4.

In other words, when the main control program controlling overall engine operation starts together with starting of the engine, it calls the control flow of FIG. 4, which then also launches. Subsequently, when this control flow is executed and returned to the main control program, it is again called from the main control program. In this way, the control flow of FIG. 4 is repeated until the main control program ends.

When the control flow of FIG. 4 starts, normal driving control is performed for a given period of time (a period of time dependent on the time required for detection of the start of regeneration control) in step S11. During this normal driving control, the engine is controlled based on fuel injection, EGR control, intake throttling, exhaust throttling, and other factors determined in accordance with the required engine speed and load, without performing forced fuel injection or the like for regeneration.

Next, in step S12, whether or not the regeneration control starts is determined. This determination is carried out in accordance with whether or not the differential pressure $\Delta P$ from the differential pressure sensor 21 has exceeded a given differential pressure determination value $\Delta P0$ (for the start of DPF regeneration). The differential pressure determination value $\Delta P0$ indicates that the volume of PM accumulation in the filter 3Ab with a catalyst has exceeded a limit and regeneration is needed.

In accordance with this determination of the start of regeneration control in step S12, if the differential pressure $\Delta P$ is not in excess of the differential pressure determination value $\Delta P0$—in other words, if not at the start of regeneration control—the control returns to step S11, normal driving control is carried out, and this determination process repeats until the differential pressure $\Delta P$ is in excess of the differential pressure determination value $\Delta P0$.

Control proceeds to step S20, if it is determined that the differential pressure $\Delta P$ is in excess of the differential pressure determination value $\Delta P0$ in the determination of the start of regeneration control in step S12. In step S20, the exhaust temperature T1 at the inlet of the oxidation catalyst 3Aa is checked, and if it is determined that the exhaust temperature T1 is not identical to the given first determining temperature Ta', control proceeds to step S30, and the first DPF regeneration control is carried out. This given first determining temperature Ta' is related to the activation of the oxidation catalyst 3Aa, and although this is normally the activation temperature Ta of the oxidation catalyst 3Aa, it is acceptable, for example, for the first determining temperature Ta' to be a temperature slightly higher than the activation temperature Ta or the like (e.g. 210° C.).

In this first DPF regeneration control, post injection is carried out with the exhaust throttle valve 31 remaining in the fully opened condition. During this post injection, HC (fuel) is supplied to the inside of the exhaust passage 2, and this HC is combusted by the oxidation catalyst 3Aa. As a result, the exhaust temperature T2 at the inlet of the filter 3Ab with a catalyst is raised to or beyond the forced combustion temperature for the accumulated PM, and the PM is forcibly combusted and removed.

In step S30, the first DPF regeneration control of step S31 is performed for a given period of time (a period of time dependent on the time required for detection of the end of regeneration control). Next, in step S32, whether or not the regeneration control ends is determined. This determination is carried out in accordance with whether or not the differential pressure $\Delta P$ from the differential pressure sensor 21 has exceeded a given differential pressure determination value $\Delta P1$ (for the end of PM regeneration). The differential pressure determination value $\Delta P1$ indicates that the volume of PM accumulation in the filter 3Ab with a catalyst has been reduced and the accumulation of PM can be restarted.

If it is determined in step S32 that regeneration control ends, the control returns to step S20, and the combustion and removal of PM is carried out while repeating the first DPF regeneration control of step S31. If it is determined in step S32 that regeneration control ends, the control returns from this step to the main control flow.

Furthermore, in the checking of exhaust temperature T1 at the inlet of the oxidation catalyst 3Aa in step S20, if the exhaust temperature T1 detected by the oxidation catalyst inlet exhaust temperature sensor 22 is less than a given first determining temperature Ta' (210° C. in this case), steps from step S40 through step S50 are performed and the second DPF regeneration control is carried out. In step S40, the delay multi-step injection control in combination with exhaust throttle valve of step S41 is performed for a given period of time (a period of time dependent on the time required for detection of the exhaust temperature T1). This control is carried out until the exhaust temperature T1 rises to or beyond the second determining temperature Ta (the activation temperature, for example, 200° C.), in accordance with checking of the exhaust temperature T1 at the inlet of the oxidation catalyst 3Aa in the subsequent step S42. When this temperature is the second determining temperature Ta or higher, regulation control of the filter inlet exhaust temperature T2 of step S50 is carried out, and PM is forcibly combusted. In step S50, delay multi-step injection and control of the opening/closing of the exhaust throttle valve 31 are carried out together in accordance with the control flow indicated in FIG. 5.

In other words, in the delay multi-step injection in combination with exhaust throttling of step S40, the exhaust temperature T1 is raised to or beyond the second determining temperature Ta. Following this, the degree of opening of the exhaust throttle valve is adjusted in step S50, and maintaining the exhaust temperature T1 at or above the second determining temperature Ta, the required HC for raising the temperature of the exhaust gas is supplied to the oxidation catalyst 3Aa. In this way, the filter inlet exhaust temperature T2 is raised to or above the PM forced combustion temperature.

In step S50, it is determined whether or not the exhaust temperature T2 at the inlet of the filter 3Ab with a catalyst of step S51 is less than a given third determining temperature Tb1 (the lower-limit PM forced combustion temperature, for example, 500° C.). If this determination indicates that the exhaust temperature T2 detected by the filter inlet exhaust temperature sensor 23 is less than the third determining temperature Tb1, the given degree of opening ($\Delta\alpha$) of the exhaust throttle valve 31 is opened ($\alpha=\alpha+\Delta\alpha$) in step S52, delay multi-step injection control is carried out for a given period of time (a period of time dependent on the time required for detection of the exhaust temperature T2), and control proceeds to step S56. If the exhaust temperature T2 is the third determining temperature Tb1 or higher, it is determined in step S53 whether or not the exhaust temperature T2 is a given fourth determining temperature Tb2 (the upper-limit PM forced combustion temperature, for example, 650° C.) or higher.

If the determination of step S53 indicates that the exhaust temperature T2 is less than the fourth determining temperature Tb2, the given degree of opening ($\Delta\alpha$) of the exhaust throttle valve 31 is closed ($\alpha=\alpha+\Delta\alpha$) in step S54, delay multi-step injection control is carried out for a given period of time (a period of time dependent on the time required for detection of the exhaust temperature T2), and control proceeds to step S56. If the exhaust temperature T2 is the fourth determining temperature Tb2 or higher, the exhaust throttling control and delay multi-step injection control of step S55 are released, and control proceeds to step S56.

Both the third determining temperature Tb1 and the fourth determining temperature Tb2 are related to the temperature of the start of forced combustion of PM accumulation in the filter 3Ab with a catalyst. Furthermore, this temperature varies in accordance with the type of catalyst supported by the filter 3Ab with a catalyst. The third determining temperature Tb1 is the lower-limit exhaust temperature of temperatures sufficient for the start of combustion of PM accumulation in the filter 3Ab with a catalyst. The fourth determining temperature Tb2 is the exhaust temperature capable of preventing the start of runaway combustion of PM accumulation in the filter 3Ab with a catalyst, or the upper-limit exhaust temperature capable of efficiently combusting and removing PM from the relationship among the exhaust temperature, fuel efficiency, and PM combustion and removal.

Next, in step S56, whether or not regeneration control ends is determined. This determination is identical to that carried out in step S32. If it is determined in step S56 that regeneration control ends, the control returns to step S51. The PM is combusted and removed, while repeating steps from step S51 through step S56 and controlling to ensure that the exhaust temperature T2 remains as Tb1≦T2<Tb2. When the regeneration of the filter 3Ab with a catalyst is sufficiently performed as a result of the combustion and removal of PM, and if it is determined that the regeneration control ends in the step S56, the control returns to the main control flow.

After returning to the main control flow, the control flow illustrated in FIG. 4 is called repeatedly, and control repeats between Start and Return in FIG. 4 until the engine stops.

Figure 6:
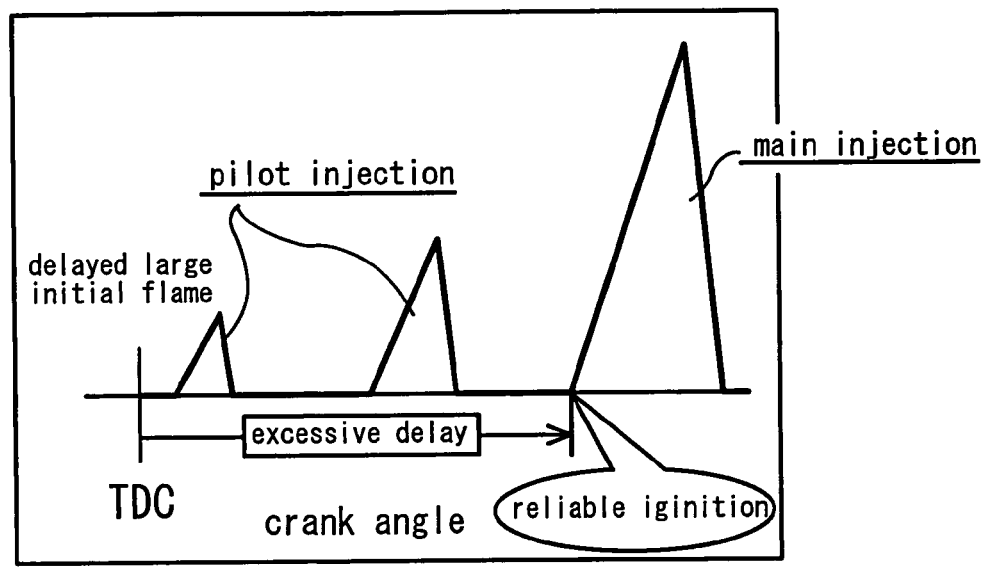
FIG. 6 is a drawing showing an example of multi-step injection corresponding to regeneration control according to the present invention.

Hereinafter, the delay multi-step injection control in combination with exhaust throttling of the present invention will be described. Although the following explanation is relevant to three-step, multi-step injection (two pilot injection and one main injection) as illustrated in FIG. 6, a higher multiplicity of injections is preferable.

In order to increase the exhaust temperature during driving of the engine E, exhaust throttling is carried out by closing the exhaust throttle valve 31. As a result, the pressure of exhaust manifold at the exit of the engine increases. The volume of exhaust gas discharged during the exhaust stroke decreases rapidly and the exhaust efficiency degrades markedly, due to this pressure increase.

In the intake stroke that follows next, the volume of exhaust gas that remains inside the combustion chamber 14 of the cylinder 13 extremely increases. However, the temperature of the exhaust gas increases by a certain degree as a result of delay in injection timing. Accordingly, a large volume of exhaust gas at high temperature remains inside the combustion chamber 14 in the intake stroke.

In the compression and combustion strokes that follow next, the temperature inside the combustion chamber 14 further increases. If the first step of the multi-step injection is now executed, ignition will occur without fail, even in the case of excessive delay injection; furthermore, transition to stable combustion can be attained. For this reason, even if the injection quantity is increased due to the excessive delay of injection, the amount of combustion energy converted into torque will be drastically low, and large initial combustion with low torque fluctuation will be achieved. Furthermore, as a result of assured combustion of the increased amount of fuel in the first injection, a high temperature will be maintained inside the combustion chamber 14 even at the middle stage of the expansion stage.

If the second injection is executed with even greater injection quantity, the ignition and combustion will occur, even if the injection timing thereof is at the end stage of the expansion stroke of the low pressure. The temperature of the exhaust gas is increased by this generation of heat, and the inside of the combustion chamber 14 is raised to a high temperature. Nevertheless, this combustion energy does not contribute to the generation of torque.

Next, the third injection is executed when combustion as a result of the second injection intensifies. In this third (main) injection step, the increase of the injection quantity does not result in the generation of torque, and further the flame thereof is intensified. Main injection fuel that is combusted around the time of opening the exhaust valve significantly contributes to the rise of temperature of the exhaust gas.

Hereinafter, an actual example of injection with an engine speed of approximately 800 rpm is described. If, for example, the exhaust temperature is 600° C. or higher, the increase in the exhaust pressure as a result of the exhaust throttling needs to be 70 kPa or higher when the engine speed is around 800 rpm. Furthermore, the timing for the first injection is set between 20° and 30° after top dead center, and the timing for the second injection is set between 35° and 50° after top dead center. The fuel injection quantity corresponding to the second injection increases approximately thirty percent times to one hundred percent times, compared to that of the first injection.

Hereinafter, the control required for adjustment of the filter inlet exhaust temperature T2 by using stepwise opening/closing control of the exhaust throttle valve 31 is explained.

A large volume of the exhaust gas at higher temperature remains at the start of the combustion stroke, reliable ignition and combustion are achieved even when ignition is delayed, and the temperature of the exhaust gas can be raised significantly, due to the delay multi-step injection in combination with the exhaust throttle valve.

If the exhaust throttle valve 31 is opened at this time, the exhaust pressure will drop, which results in the reduction of the residual exhaust gas at high-temperature inside the combustion chamber 14; therefore, the ignition and combustion capabilities of the injection fuel decrease, and the portion of non-combusted injection fuel increases. Accordingly, HC, which is the fuel, increases within the exhaust gas. In such a case, the exhaust temperature T1 at the inlet of the oxidation catalyst 3Aa drops as the HC that flows into the exhaust gas increases. However, since the volume of HC flowing into the oxidation catalyst 3Aa increases, the HC combusts in the oxidation catalyst 3Aa if the exhaust temperature T1 is the activation temperature Ta or higher. Accordingly, the exhaust temperature T2 at the inlet of the filter on the downstream side of the oxidation catalyst 3Aa rises.

Conversely, if the exhaust throttle valve 31 is closed at this time, the exhaust pressure will increase, which results in the increase of the residual exhaust gas at high-temperature in the combustion chamber 14; therefore the ignition and combustion capabilities of the injection fuel increase, and the portion of non-combusted injection fuel decreases. Accordingly, HC, which is the fuel decreases within the exhaust gas. In such a case, the exhaust temperature T1 at the inlet of the oxidation catalyst 3Aa rises as the HC that flows into the exhaust gas decreases. However, since the volume of HC flowing into the oxidation catalyst 3Aa decreases, the volume of HC combustion in the oxidation catalyst 3Aa decreases, even if the exhaust temperature T1 is the activation temperature Ta or higher. Accordingly, the exhaust temperature T2 at the inlet of the filter on the downstream side of the oxidation catalyst 3Aa drops.

Using this mechanism, the exhaust temperature T1 at the inlet of the oxidation catalyst 3Aa and the volume of HC provided to the oxidation catalyst 3Aa are controlled, and as a result, the combustion of HC in the oxidation catalyst 3Aa is controlled. Accordingly, the exhaust temperature T2 at the inlet of the filter on the downstream side of the oxidation catalyst 3Aa is also controlled.

It is acceptable to perform the adjustment of the degree of opening of the exhaust throttle valve 31 in a stepwise or continuous manner. Furthermore, it is also acceptable to employ feedback control that makes the exhaust temperature T2 at the inlet of the filter match a target value or lie within a target range. It is also acceptable to create map data for the degree of opening of the exhaust throttle valve with respect to engine speed, load, and other factors through advance testing and the like, and to perform control in which the degree of opening of the exhaust throttle valve is determined by referencing this map data.

Figure 7:
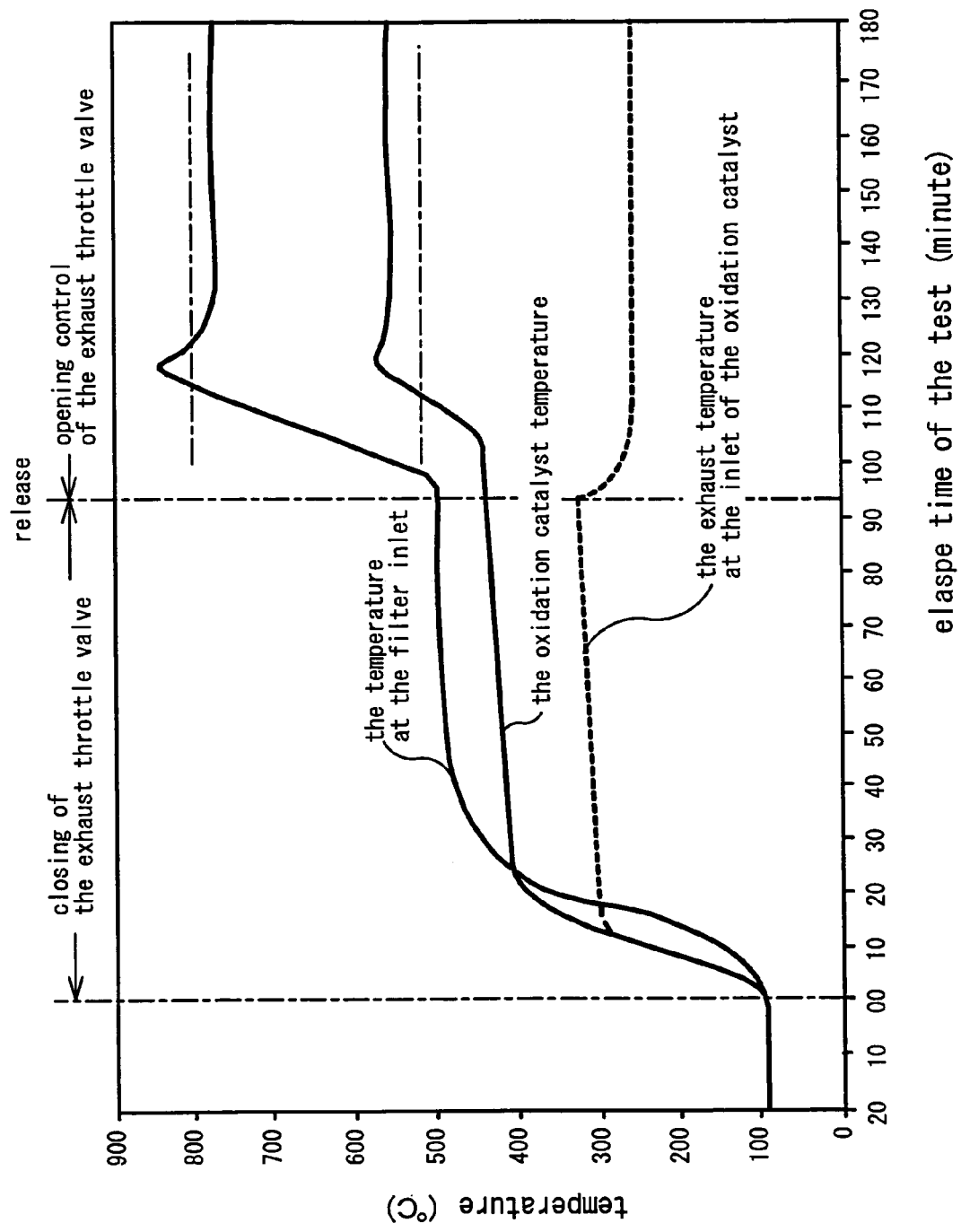
FIG. 7 is a diagram showing the oxidation catalyst temperature and the filter inlet temperature of the exhaust gas according to an embodiment of the present invention.
Figure 8:
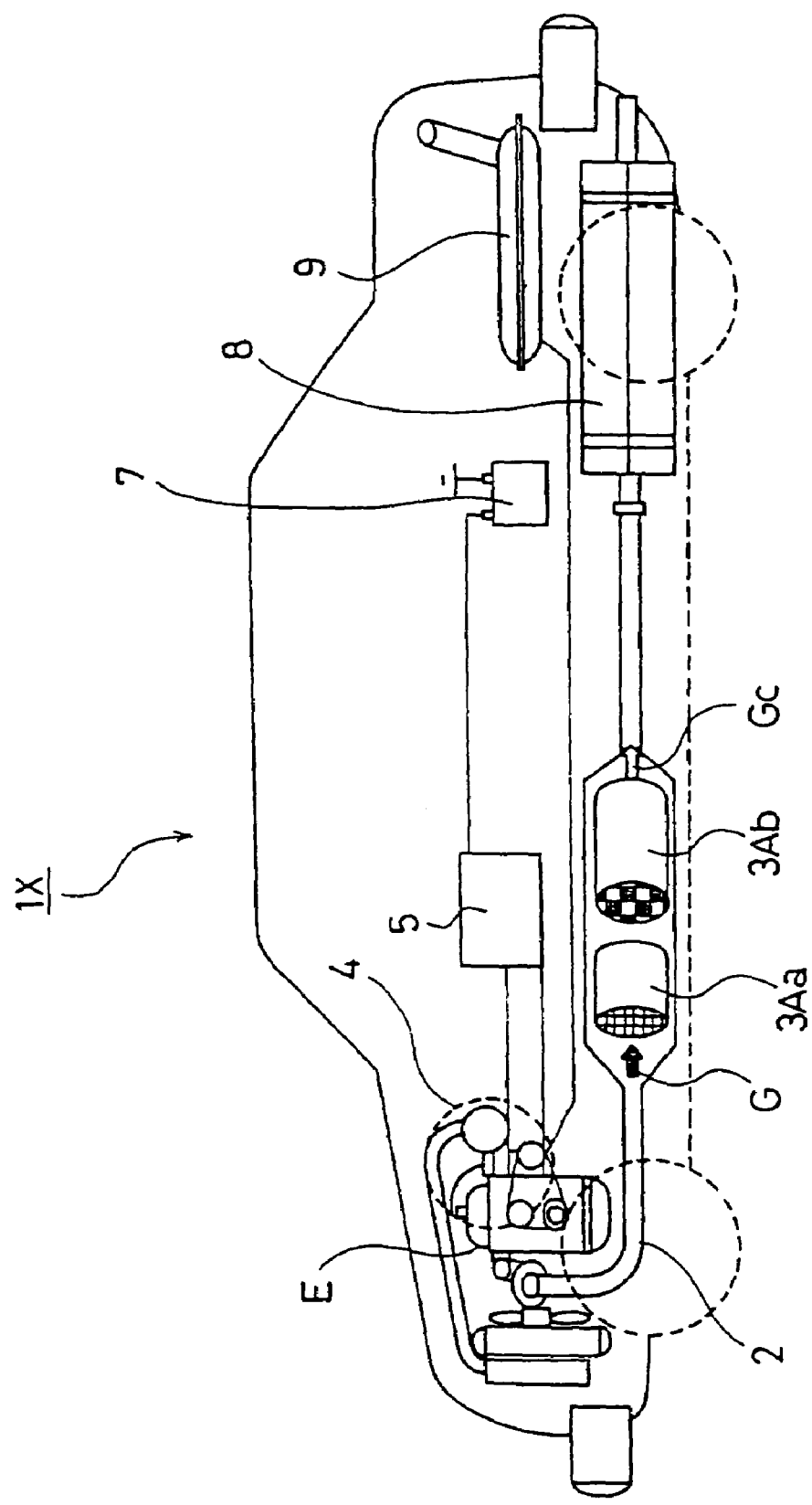
FIG. 8 is a systematic block diagram showing an example of an exhaust gas purifying system in the prior art.
Figure 9:
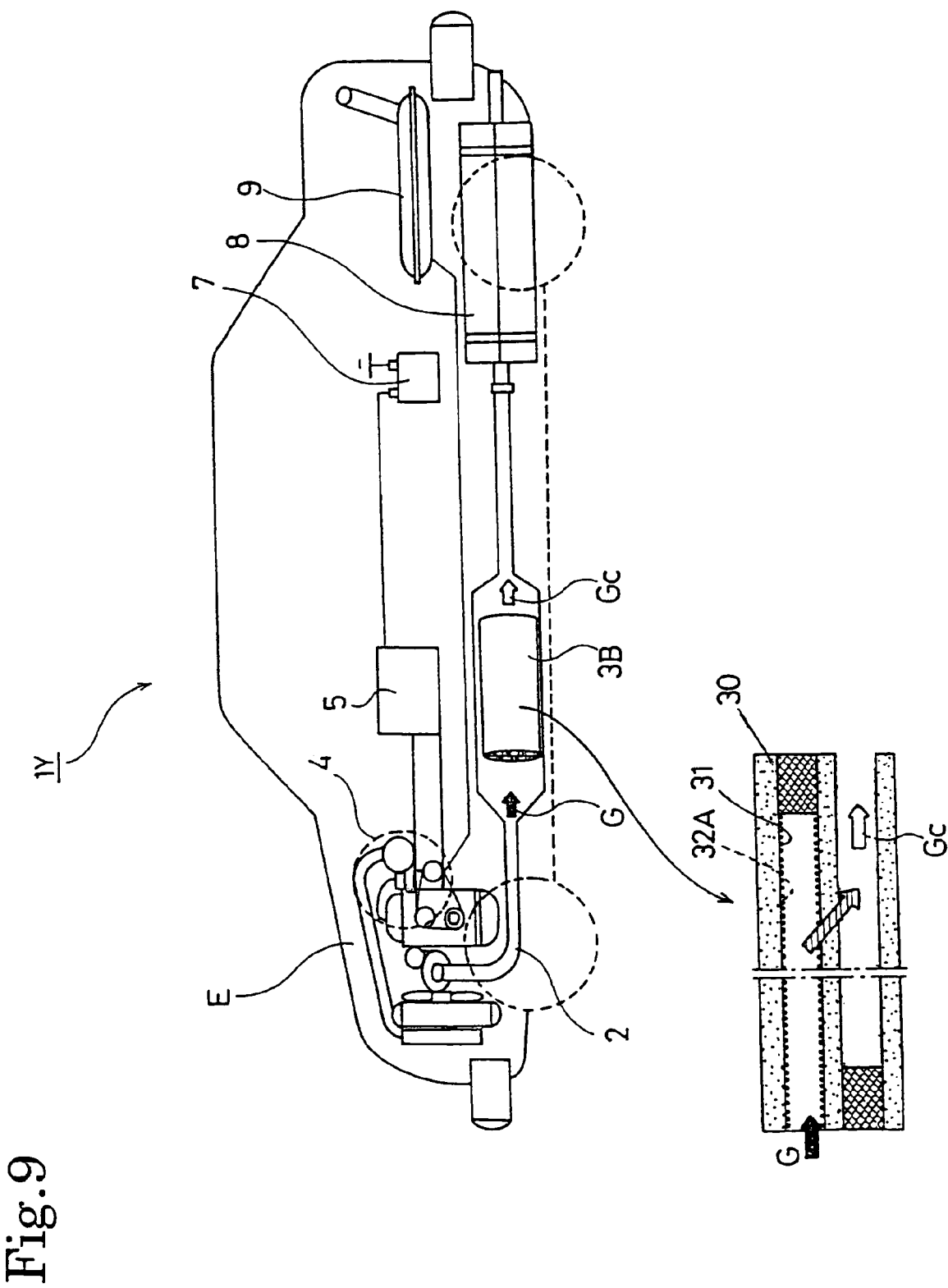
FIG. 9 is a systematic block diagram showing another example of an exhaust gas purifying system in the prior art.
Figure 10:
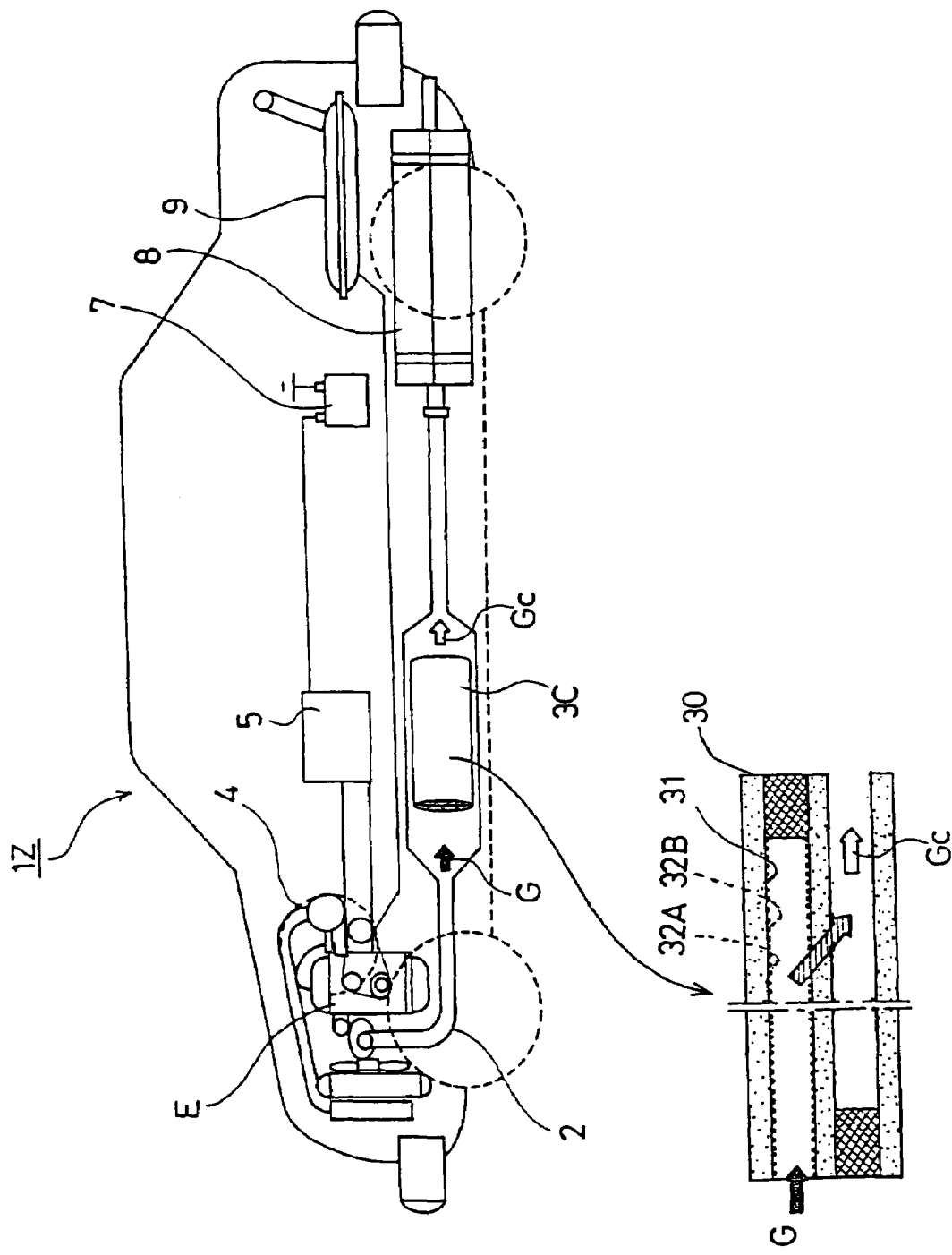
FIG. 10 is a systematic block diagram showing another example of an exhaust gas purifying system in the prior art.

FIG. 7 shows an embodiment of the present invention, in which the excessive delay multi-step injection control in combination with exhaust throttling is carried out during idling at the engine speed of 850 rpm. This embodiment illustrates the variations in oxidation catalyst temperature and filter temperature upon the execution of stepwise opening/closing control of the exhaust throttle valve for the purpose of forced PM regeneration.

This embodiment employs three-step multi-step injection. When exhaust throttling is carried out, the exhaust pressure increases and the oxidation catalyst reaches the activation temperature within one minute of the start of exhaust throttling. However, when exhaust throttling is carried out with the exhaust throttle valve remaining in the closed condition, the supply of HC is insufficient, resulting in the temperature inside the filter not to rise to the forced PM combustion temperature.

Subsequently, if the exhaust throttling control is released and opening control of the exhaust throttle valve is executed, the exhaust pressure rapidly decreases, the ratio of fuel combusted inside the cylinder drops, and the volume of HC supplied to the oxidation catalyst increases. For this reason, the temperature at the filter inlet rises rapidly, exceeding the temperature at the start of forced PM combustion. Meanwhile, the exhaust temperature at the inlet of the oxidation catalyst drops. Therefore, by adjusting the degree of opening of the exhaust throttle valve, it is possible to control the oxidation catalyst temperature, the exhaust temperature at the inlet of the oxidation catalyst, and the exhaust temperature at the inlet of the filter.

Using the exhaust gas purifying system 1 of the above-described configuration, when the differential pressure detected by the differential pressure sensor 21 rises above a set level and the PM accumulation in the filter 3Ab with a catalyst of the continuous regeneration DPF 3 reaches a volume requiring regeneration, it is possible to perform regeneration of the filter 3Ab with a catalyst as follows.

When the exhaust temperature T1 is the first determining temperature Ta' (the activation temperature Ta of the oxidation catalyst 3Aa or higher) or higher, regeneration of the filter 3Ab with a catalyst is carried out by using the first DPF regeneration control in a state of the exhaust throttle valve 31 open. Next, when the exhaust temperature T1 is lower than the first determining temperature Ta' as a result of situations in which the exhaust temperature is extremely low in low-load and low-speed engine operation conditions, such as idling, regeneration of the filter 3Ab with a catalyst can be carried out by the adjusted control of the exhaust temperature T2 at the inlet of the filter. This adjustment control is the control for adjusting the degree of opening by delay multi-step injection control in combination with opening/closing control of the exhaust throttle valve exhaust throttling, which is the second DPF regeneration control.

Accordingly, even with the engine operating condition in which the exhaust temperature is extremely low during low-load and low-speed conditions, such as idling, the execution of both delay multi-step injection control in combination with exhaust throttling and exhaust throttle valve opening control allows simultaneous adjustment of the exhaust temperature T1 at the inlet of the oxidation catalyst 3Aa and the exhaust temperature T2 at the inlet of the filter 3Ab with a catalyst. Accordingly, the temperature of the exhaust gas can be efficiently raised, PM is forcibly combusted and removed, and as a result, regeneration of the filter 3Ab with a catalyst is achieved.

Consequently, it is possible to avoid excessive accumulation of PM in the filter 3Ab with a catalyst as a result of ongoing driving conditions of impossible regeneration. In addition, it is possible to prevent damage to the filter 3Ab with a catalyst as a result of runaway combustion of the PM that is caused by this excessive accumulation. Rise of the exhaust pressure caused by blockage of the filter 3Ab with a catalyst can also be suppressed, preventing the occurrence of problems such as engine stalling at high levels of exhaust pressure, and also improving fuel efficiency.

Furthermore, as a result of delay multi-step injection control in combination with exhaust throttling, it is possible to prevent the occurrence of high-concentration HC in the exhaust gas when the exhaust temperature T1 is the activation temperature Ta of the oxidation catalyst 3Aa or lower. Accordingly, HC accumulation in the oxidation catalyst 3Aa, and the generation of high temperature as a result of rapid combustion of HC accumulated in the oxidation catalyst 3Aa, can both be prevented. It is therefore possible to prevent catalyst aging and damage resulting from such generation of high temperature.

In addition, the first DPF regeneration control that is not combined with exhaust throttling, and the second DPF regeneration control comprising delay multi-step injection control in combination with exhaust throttling, are selectively used depending on the exhaust temperature T1; therefore, the period required for rise of the exhaust pressure can be shortened and problems such as deterioration of fuel efficiency can be prevented.

The above description refers to a continuous regeneration DPF 3 with an oxidation catalyst and a PM oxidation catalyst in the filter 3Ab with a catalyst; however, the present invention also applies to a continuous regeneration DPF with an oxidation catalyst or a PM oxidation catalyst in a filter and to a continuous regeneration DPF with no catalyst in a filter.

INDUSTRIAL APPLICABILITY

The present invention provides an exhaust gas purifying system capable of reducing torque fluctuation and preventing the occurrence of white smoke during control of DPF regeneration for a continuous regeneration DPF.

Accordingly, the present invention can be used in an exhaust gas purifying system providing a continuous regeneration DPF, allowing the exhaust gas generated by vehicles and the like that feature such a system to be efficiently purified and air pollution to be prevented.

What is claimed is:

1. An exhaust gas purifying system comprising a filter provided in an exhaust passage of an internal combustion engine for accumulating particulate matters, an oxidation catalyst provided on the upstream side of said filter, an exhaust throttle valve provided on the upstream side of said oxidation catalyst or on the downstream side of said filter, a first exhaust temperature sensor provided at the inlet of said oxidation catalyst, a second exhaust temperature sensor provided between said oxidation catalyst and said filter, and a control device for regeneration of said filter, characterized in that said control device, upon the execution of control for regeneration of said filter, raises the temperature of the exhaust gas, by performing delay multi-step injection control in a state of closing said exhaust throttle valve, when the exhaust temperature detected by said first exhaust temperature sensor is a given first determining temperature or less; and controls to open said exhaust throttle valve in a stepwise or continuous manner after the exhaust temperature detected by said first exhaust temperature sensor has risen to a given second determining temperature or higher, in such a way that the exhaust temperature detected by said second exhaust temperature sensor rises to a given third determining temperature or higher.

2. The exhaust gas purifying system of claim 1, further characterized in that, after the exhaust temperature at the inlet of said oxidation catalyst has risen to said second determining temperature or higher, in the case where the exhaust temperature detected by said second exhaust temperature sensor rises to said third determining temperature or higher, said exhaust throttle valve is closed in a stepwise or continuous manner.

3. The exhaust gas purifying system of claim 1 or 2, further characterized in that, said exhaust throttle valve control and delay multi-step injection control are released, in the case where the exhaust temperature detected by said second exhaust temperature sensor rises to or beyond a given fourth determining temperature which is higher than said third determining temperature, after the exhaust temperature at the inlet of said oxidation catalyst has risen to said second determining temperature or higher.

4. The exhaust gas purifying system of any one of claims 1 or 2, further characterized in that upon regeneration control for said DPF, the temperature of the exhaust gas is raised such that the exhaust temperature detected by said second exhaust temperature sensor rises to or beyond said third determining temperature, by performing delay multi-step injection control in a state of said exhaust throttle valve open, when the exhaust temperature detected by said first exhaust temperature sensor is higher than said first determining temperature.

5. The exhaust gas purifying system of any one of claims 1 or 2, further characterized in that said first determining temperature is a temperature higher than an activation temperature of said oxidation catalyst, and said second determining temperature is the activation temperature of said oxidation catalyst.

6. The exhaust gas purifying system of any one of claims 1 or 2, further characterized in that said third determining temperature is the exhaust temperature at which combustion of the particulate matters accumulated in said filter begins.

7. The exhaust gas purifying system of any one of claims 1 or 2, further characterized in that said filter is formed by a filter with an oxidation catalyst, a PM oxidation catalyst, or both an oxidation catalyst and a PM catalyst.

* * * * *